United States Patent [19]

Hosokawa et al.

[11] 3,960,393
[45] June 1, 1976

[54] HOSE CONNECTOR

[75] Inventors: Hiroyuki Hosokawa, Obu; Shiro Maeda, Toyohashi; Kenji Yamada, Anjo, all of Japan

[73] Assignee: Nippondenso Co., Ltd., Kariya, Japan

[22] Filed: Mar. 4, 1975

[21] Appl. No.: 555,270

[30] Foreign Application Priority Data
Apr. 16, 1974 Japan................................ 49-43065

[52] U.S. Cl............................... 285/137 R; 285/423
[51] Int. Cl.² ......................................... F16L 39/00
[58] Field of Search............. 285/368, 340, DIG. 12, 285/DIG. 3, 412, 137 R, 185, 191, 423

[56] References Cited
UNITED STATES PATENTS

| | | |
|---|---|---|
| 3,214,195 | 10/1965 | Zahuranel et al............ 285/137 R X |
| 3,305,249 | 2/1967 | Zahuranel.................. 285/137 R X |
| 3,561,797 | 2/1971 | Wagner...................... 285/368 |
| 3,820,828 | 6/1974 | Fiddler....................... 285/137 R |
| 3,869,152 | 3/1975 | De Vincent................. 285/137 R |

*Primary Examiner*—Dave W. Arola
*Attorney, Agent, or Firm*—Cushman, Darby & Cushman

[57] ABSTRACT

A hose connector having a couple of connecting plates to which the hose should be connected, gasket put between the plates to be pressed against the plates, a couple of slightly curved plate pressures put on the plates opposite to the gasket and fixing means for fixing the above elements all together, pressing and flattening the plate pressures inwardly for connecting the hose via the plates with high sealing function and low cost.

2 Claims, 5 Drawing Figures

HOSE CONNECTOR

BACKGROUND OF THE INVENTION

This invention relates to a hose connector which is useful to connect a bundle of hoses to another bundle of hoses with ease. In an exhaust gas purifying device of the vehicle, there are many hoses to lead a plurality of pressures including vacuum pressure to various actuators or pressure control units from the intake pipe or air pump. Generally, actuators or pressure control units are mounted on the vehicle body, while the intake pipe or air pump is mounted on the engine. Therefore, the misconnection of the hoses is apt to occur on assembling the vehicle to result in a breakdown of the exhaust gas purifying device.

SUMMARY OF THE INVENTION

The object of the present invention is to provide an improved hose connector which is useful to connect a bundle of hoses to another bundle and which presents a high sealing function with low cost and simple production process.

The above and other objects, features and advantages of the present invention will be apparent from the following detailed description of preferred embodiments taken in conjunction with the accompanying drawings.

DESCRIPTION OF THE PREFERRED EMBODIMENT

Figure 1:
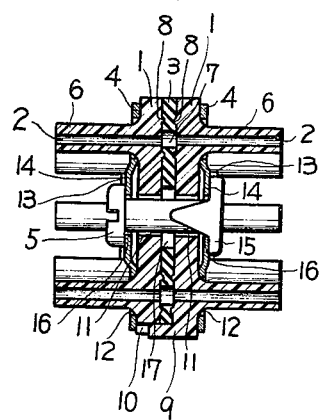
FIG. 1 shows a cross sectional view of the first embodiment of the present invention.
Figure 2:
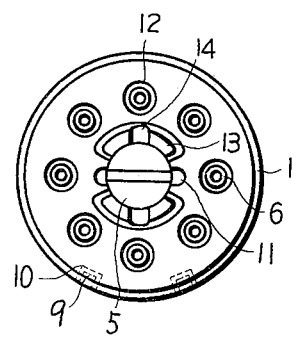
FIG. 2 shows a side view of the first embodiment shown in FIG. 1.
Figure 3:
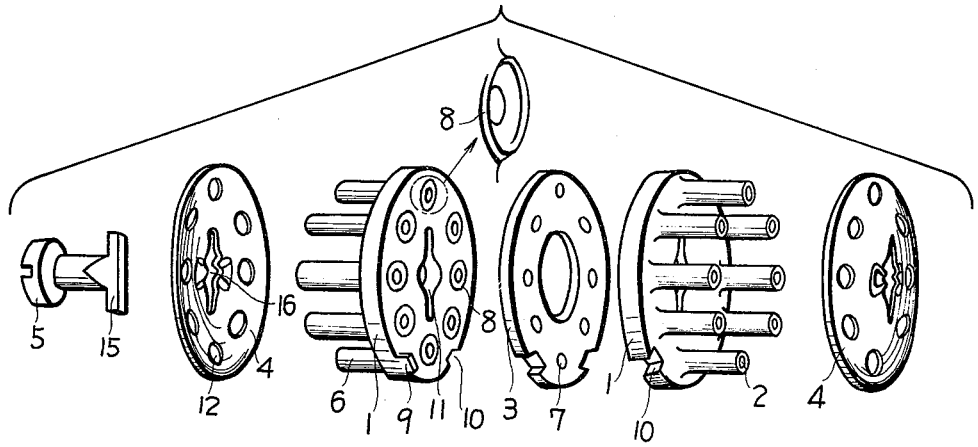
FIG. 3 shows a perspective view of the parts of the first embodiment shown in FIG. 1.

Referring to FIGS. 1, 2 and 3, numeral 1 designates a couple of connecting plates made of hard plastic, such as acetal copolymer, to which a plurality of pipes 6 are integrally formed for connecting a plurality of hoses for exhaust gas purifying devices. This connection may be attained only by insertion. Around the openings of the inner passages 2 of the connecting plate 1, there are formed a plurality of circular projections 8 which encircle the openings. Between the couple of the connecting plates 1 a gasket 3 of soft rubber is placed. The gasket 3 has plural apertures 7 respectively corresponding to the inner passages 2 of said connecting plates 1. At the circumferences of the apertures 7 the projections 8 press to deform the gasket 3 for a perfect seal. A couple of spring plates 4 which is slightly conical and has plural apertures 12 corresponding to the pipes 6 are positioned on the connecting plates 1 at the side opposite to the projections 8 and the gasket 3 to receive the pipes 6 by the apertures 12 to press the connecting plates 1, thereby applying a pressure to the projections 8. A stud 5 made of aluminum is inserted from the spring plate 4 to fix the spring plate 4, connecting plate 1, gasket 3, the other connecting plate 1 and the other spring plate 4 through apertures 16, 11 and 17 and is anchored by the other spring plate so that the couple of spring plates can provide optimum pressure. On the outer surface of the spring plate 4 segmental projections 13 and grooves 14 are formed to anchor the stud 5 tightly, receiving a stopper 15 of the stud 5 into the grooves 14, therefore, the stud 5 can be easily anchored by screwing it a certain angle, for example, a quarter turn. The connecting plate 1 is provided with a convex and a concave portion respectively for a correct setting of the couple of connecting plates 1. In this embodiment, the couples of connecting plates 1 and spring plate 4 comprises exactly the same member respectively, therefore, the producing cost can be kept at lower value.

Figure 4:
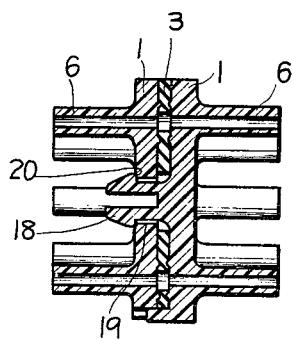
FIG. 4 shows a cross sectional view of the second embodiment of the present invention.

FIG. 4 shows another embodiment, in which a kerfed-bulging projection integrally formed on one connecting plate 1 to be inserted into a circular hold 19 formed in the other connecting plate 1 thus fixing the plates to each other by edges 20 of the kerfed-bulging projection 18, therefore, coupling is easier than the abovementioned embodiment. It is noted that the spring plate and the stud are omitted in this embodiment.

Figure 5:
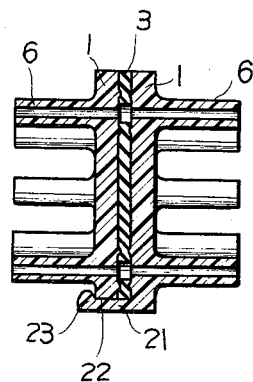
FIG. 5 shows a cross sectional view of the third embodiment of the present invention.

FIG. 5 shows the third embodiment, in which plural stoppers 21 having hook portion 23 are integrally formed on one connecting plate 1 to engage with plural notches 22 formed on the other plate 1 to couple the both plates 1. In this embodiment, the same effect as the above second embodiment can be expected.

What we claim is:

1. A hose connector comprising:

a couple of connecting plates each of which has a plurality of pipes integrally formed on one side thereof for connection to a plurality of hoses and a plurality of endless projections formed on the other side thereof, inner passages of said pipes running through said plate, said endless projections enclosing openings of said inner passages;

a gasket between said connecting plates and having a plurality of apertures corresponding to said pipes, circumferential portions of said apertures being pressed by said endless projections for a perfect seal;

a couple of plate retainers located on said connecting plates opposite to said gasket, each plate retainer having a plurality of apertures corresponding to said pipes to pass said pipes therethrough and having slight curvature for permitting the pressing of said connecting plates to said gasket by spring action; and means for pressing and flattening said plate retainers thereby fixing said connecting plates, gasket and plate retainers all together to connect said inner passages of said connecting plates to each other through said apertures of said gasket.

2. A hose connector comprising:

a couple of connecting plates made of hard plastic each of which has a plurality of pipes integrally formed on one side thereof, whose inner passages run through said plate, and has a plurality of circular projections formed on the other side of said plate for enclosing the openings of said inner passages;

a gasket made of soft rubber and put between said connecting plates, and having a plurality of apertures corresponding to said pipes, whose circumferences are pressed by said circular projections to form a perfect seal;

a couple of plate retainers made of steel and located on said connecting plates opposite to said gasket, each of which has a plurality of apertures corresponding to said pipes to pass them therethrough and has slight curvature for pressing said plates to said gasket by spring action, and a stud for pressing and flattening said plate retainers, thereby tightly connecting said connecting plates, gasket and retainers all together to connect said inner passages of said connecting plates to each other through said apertures of said gasket.

* * * * *